(12) United States Patent
Tian

(10) Patent No.: US 11,488,621 B1
(45) Date of Patent: Nov. 1, 2022

(54) ESTIMATION THROUGH MULTIPLE MEASUREMENTS

(71) Applicant: TENCENT AMERICA LLC, Palo Alto, CA (US)

(72) Inventor: Jun Tian, Belle Mead, NJ (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/488,419

(22) Filed: Sep. 29, 2021

Related U.S. Application Data

(60) Provisional application No. 63/178,660, filed on Apr. 23, 2021.

(51) Int. Cl.
*G10L 25/51* (2013.01)

(52) U.S. Cl.
CPC .................................... *G10L 25/51* (2013.01)

(58) Field of Classification Search
None
See application file for complete search history.

(56) References Cited

U.S. PATENT DOCUMENTS

| | | | |
|---|---|---|---|
| 9,967,302 B2* | 5/2018 | Lim | H04L 65/762 |
| 2022/0058833 A1* | 2/2022 | Faramarzi | G06T 7/10 |

OTHER PUBLICATIONS

2nd International Conference on Advanced Computing and Software Engineering, "Complexity Estimation Technique for Large Scale Software Based on Communicating Parameters," Tiwari et al., pp. 625-629 (Year: 2019).*

International Organisation for Standardisation, "Break-out Group recommendations on complexity estimation method," m56586, Apr. 2021 (3 pages).

* cited by examiner

*Primary Examiner* — Paul W Huber
(74) *Attorney, Agent, or Firm* — ArentFox Schiff LLP

(57) ABSTRACT

Aspects of the disclosure include methods, apparatuses, and non-transitory computer-readable storage mediums for estimating a complexity of an audio render program. One apparatus includes processing circuitry that performs a first measurement on a consumption of a resource by running a first plurality of instances of the audio render program on an audio evaluation platform. The processing circuitry performs a second measurement on the consumption of the resource by running a second plurality of instances of the audio render program on the audio evaluation platform. A first number of the first plurality of instances is different from a second number of the second plurality of instances. The processing circuitry estimates the complexity of the audio render program based on the first measurement, the second measurement, the first number of the first plurality of instances, and the second number of the second plurality of the instances.

20 Claims, 3 Drawing Sheets

ESTIMATION THROUGH MULTIPLE MEASUREMENTS

INCORPORATION BY REFERENCE

The present application claims the benefit of priority to U.S. Provisional Application No. 63/178,660, "ESTIMATION THROUGH MULTIPLE MEASUREMENTS," filed on Apr. 23, 2021, which is incorporated by reference herein in its entirety.

TECHNICAL FIELD

The present disclosure describes embodiments generally related to estimation in a noisy environment.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Quantity estimation in a noisy environment is a challenging task, as the measurement is often polluted by the noise. In some related examples, a self-comparison method has been proposed for a complexity estimation of an immersive audio renderer. In the self-comparison method, the complexity is measured by comparing a usage of a central processing unit (CPU) with 1 instance and N instances of an application program.

SUMMARY

Aspects of the disclosure provide apparatuses for estimating a complexity of an audio render program. One apparatus includes processing circuitry that performs a first measurement on a consumption of a resource by running a first plurality of instances of the audio render program on an audio evaluation platform. The processing circuitry performs a second measurement on the consumption of the resource by running a second plurality of instances of the audio render program on the audio evaluation platform. A first number of the first plurality of instances is different from a second number of the second plurality of instances. The processing circuitry estimates the complexity of the audio render program based on the first measurement, the second measurement, the first number of the first plurality of instances, and the second number of the second plurality of the instances.

In one embodiment, the first number of the first plurality of instances is equal to the second number of the second plurality of instances minus one.

In one embodiment, the processing circuitry determines a consumption difference between the first measurement and the second measurement. The processing circuitry determines an instant number difference between the first number of the first plurality of instances and the second number of the second plurality of instances. The processing circuitry estimates the complexity of the audio render program based on the consumption difference and the instant number difference.

In one embodiment, the processing circuitry performs a third measurement on the consumption of the resource by running a third plurality of instances of the audio render program on the audio evaluation platform. The processing circuitry estimates the complexity of the audio render program based on a linear regression model that is applied to the first measurement, the second measurement, and the third measurement.

In one embodiment, the resource comprises one of a central processing unit (CPU) runtime, a graphics processing unit (GPU) runtime, a CPU occupancy rate, or a GPU occupancy rate.

In one embodiment, the consumption of the resource is one of a runtime of the resource or an occupancy percentage of the resource.

In one embodiment, the audio render platform is one of a CPU based platform or a GPU based platform.

Aspects of the disclosure provide methods for estimating a complexity of an audio render program. In one method, a first measurement is performed on a consumption of a resource by running a first plurality of instances of the audio render program on an audio evaluation platform. A second measurement is performed on the consumption of the resource by running a second plurality of instances of the audio render program on the audio evaluation platform. A first number of the first plurality of instances is different from a second number of the second plurality of instances. The complexity of the program is estimated based on the first measurement, the second measurement, the first number of the first plurality of instances, and the second number of the second plurality of the instances.

Aspects of the disclosure also provide non-transitory computer-readable mediums storing instructions which when executed by at least one processor cause the at least one processor to perform any one or a combination of the methods for estimating a complexity of an audio render program.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Complexity Estimation

Figure 1:
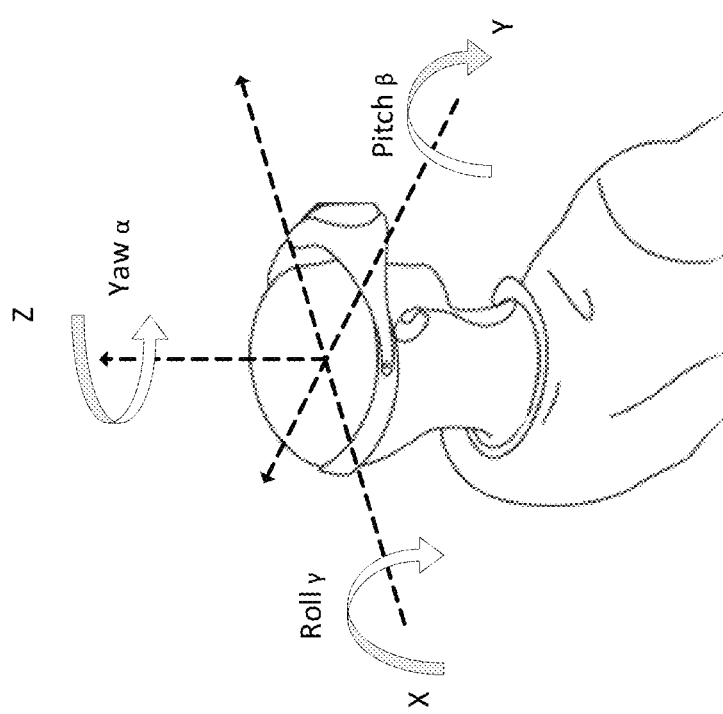
FIG. 1 shows an example of 6 degrees of freedom according to an embodiment of the disclosure.

Moving picture experts group (MPEG) has proposed a suite of standards including immersive audio, immersive video, and systems support. The suite of standards can support a virtual reality (VR) or an augmented reality (AR) presentation in which a user can navigate and interact with an environment using 6 degrees of freedom (6 DoF). FIG. 1 shows an example of 6 degrees of freedom according to an embodiment of the disclosure. In FIG. 1, the 6 degrees of freedom can be represented by a spatial navigation (x, y, z) and a user head orientation (yaw, pitch, roll).

In the immersive audio or video environment, an accurate estimation of a complexity of a program running on a device (e.g., VR or AR device) is challenging due to the existence of noise.

In some related examples, a self-comparison method can be used to estimate a complexity of a program. For example, in an audio scene, a complexity of an audio render program can be estimated by a central processing unit (CPU) usage (e.g., runtime) when an audio render program is running on the CPU. The audio render program can be Max/MSP which is a visual programming language for music and multimedia.

In an example, the audio render program can be run on a standard test bench in MPEG standard, such as audio evaluation platform (AEP). The audio render program can be run on the AEP as plugin software. In a first measurement, the audio render program can be run on the AEP with one instance of the plugin software and the measured CPU workload is $A_1$. In a second measurement, the audio render program can be run on the AEP with multiple (N) instances of the plugin software and the measured CPU workload is $A_N$. Thus, the complexity of the audio render program can be estimated as $A_{plugin}$ $(A_N-A_1)/(N-1)$. $A_{plugin}$ can be used for comparative complexity estimation.

The assumption of the self-comparison method is that the noise in the measurement $A_N$ is equal to the noise in the measurement $A_1$. Though the noises in $A_N$ and $A_1$ can be close in one case, they can be quite different in another case. With this consideration, this disclosure includes methods of estimating a complexity through multiple measurements, in order to obtain a better estimation in a noisy environment.

The disclosed estimation methods are not limited to complexity measurement. They can be applied to estimation of various variables in a noisy environment.

It is noted that the methods included in this disclosure can be used separately or in combination. The methods can be used in part or as a whole.

In this disclosure, the complexity measurement can be a consumption of a resource when an instance of the audio renderer program is running on a certain platform, such as a CPU based platform, a graphics processing unit (GPU) based platform, or the like. The consumption of the resource can be measured in a resource runtime, a resource occupancy percentage, or the like.

In one embodiment, a first measurement can be performed by running a first plurality (M1) of instances of the plugin software on the AEP, and a consumption of a resource is $A_{M1}$. A second measurement can be performed by running a second plurality (M2) of instances of the plugin software on the AEP, and the consumption of the same resource is $A_{M2}$. The complexity of the audio render program can be estimated as $A=(A_{M1}-A_{M2})/(M1-M2)$, assuming M1 is greater than M2. In this embodiment, M1 and M2 are both positive integers, and M1 is not equal to M2.

In one embodiment, both M1 and M2 are greater than 1.

In one embodiment, M2=M1-1. Thus, a first measurement can be performed by running M1 instances of the plugin software on the AEP, and a consumption of a resource is $A_{M1}$. A second measurement can be performed by running M1-1 instances of the plugin software on the AEP, and the consumption of the same resource is $A_{M1-1}$. In this embodiment, M1 is a positive integer that is great than or equal to 2. Then, the complexity of the audio render program can be estimated as $A=A_{M1}-A_{M1-1}$.

In one embodiment, a first measurement can be performed by running M1 instances of the plugin software on the AEP, and a consumption of a resource is $A_{M1}$. A second measurement can be performed by running M2 instances of the plugin software on the AEP, and the consumption of the same resource is $A_{M2}$. A third measurement can be performed by running M3 instances of the plugin software on the AEP, and the consumption of the same resource is $A_{M3}$.

In this embodiment, M1, M2, and M3 are different positive integers. It is assumed that the measured consumption $A_i$ (i=M1, M2, or M3) and the estimated complexity A can fit a linear regression model as $A_i=i*A+B$. Then, the estimated complexity A can be solved through the linear regression as follows:

$$\begin{bmatrix} A_{M1} \\ A_{M2} \\ A_{M3} \end{bmatrix} = \begin{bmatrix} M1 \\ M2 \\ M3 \end{bmatrix} A + B \quad \text{(Eq. 1)}$$

In one embodiment, multiple measurements $A_1, A_2 \ldots A_k$ can be performed, where $A_i$ is the measured consumption of a same resource with $L_i$ instances of the plugin software, $L_i$ is a positive integer, i=1, 2 ... k, and k is a positive integer that is greater than or equal to 2. It is assumed that the measured consumption and the estimated complexity A can fit a linear regression model as $A_i=L_i*A+B$. Then, the estimated complexity A can be solved through the linear regression as follows:

$$\begin{bmatrix} A_1 \\ \vdots \\ A_k \end{bmatrix} = \begin{bmatrix} L_1 \\ \vdots \\ L_k \end{bmatrix} * A + B \quad \text{(Eq. 2)}$$

II. Flowchart

Figure 2:
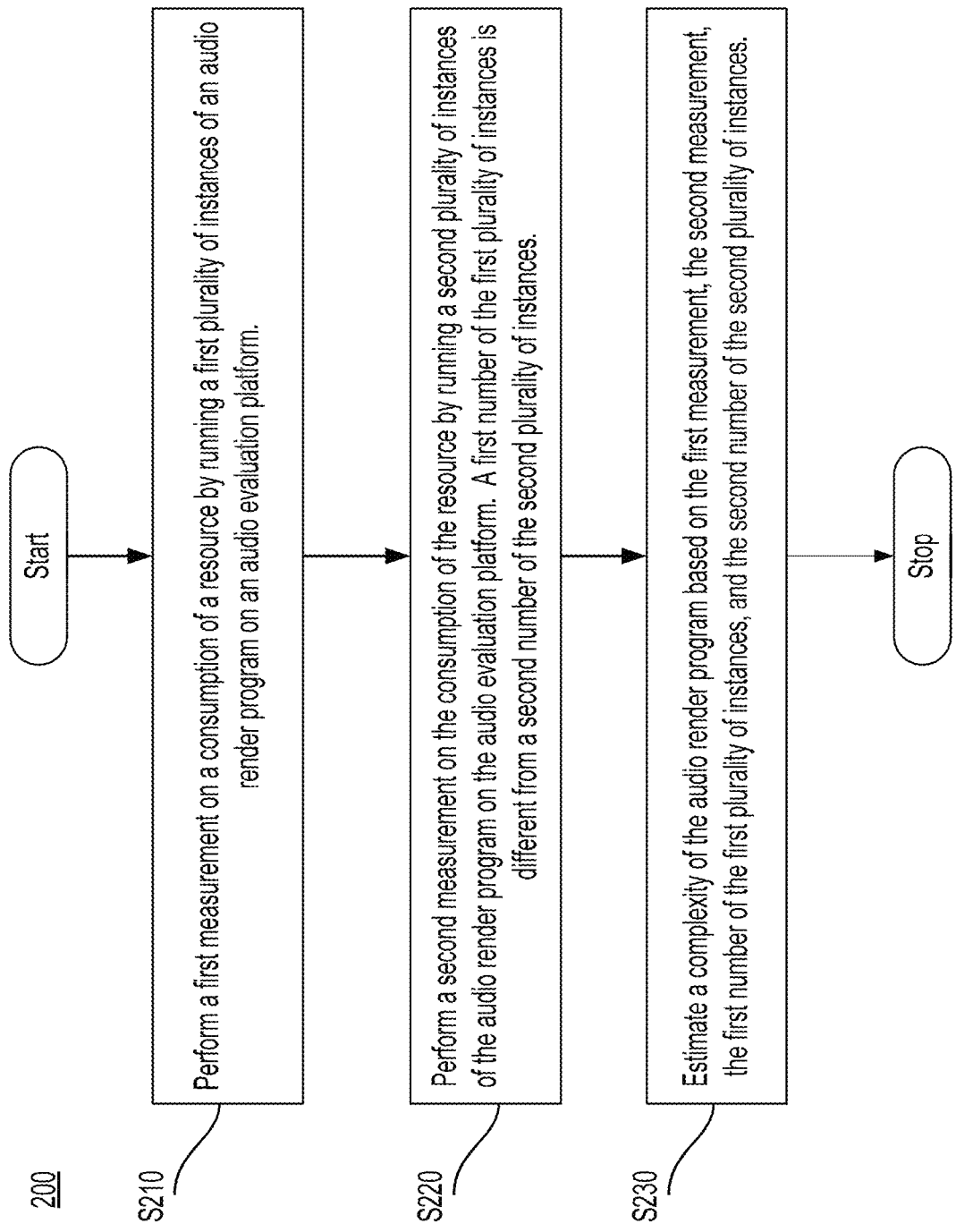
FIG. 2 shows an exemplary flowchart according to an embodiment of the disclosure.
Figure 3:
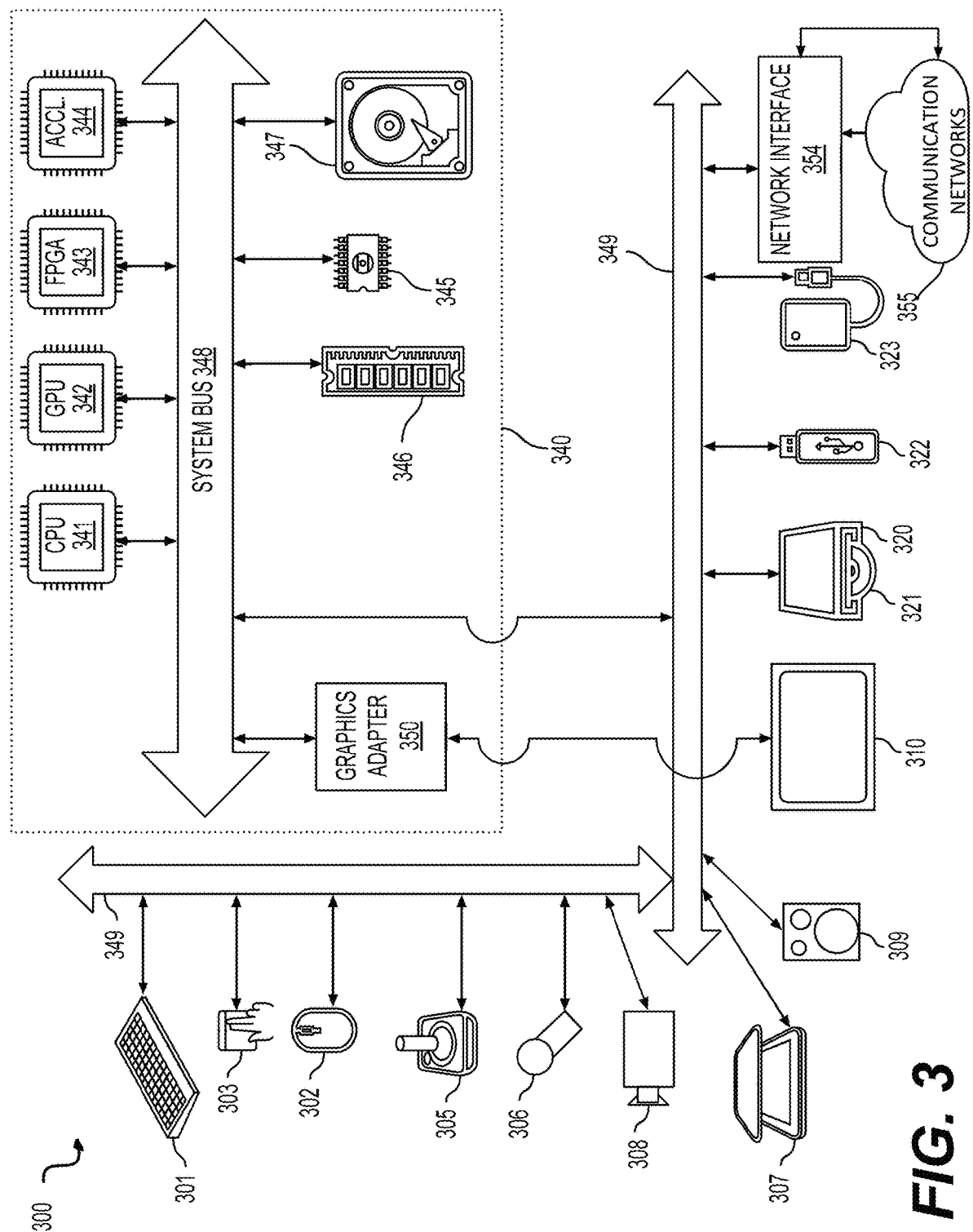
FIG. 3 is a schematic illustration of a computer system according to an embodiment of the disclosure.

FIG. 2 shows a flow chart outlining an exemplary process (200) according to an embodiment of the disclosure. In various embodiments, the process (200) is executed by processing circuitry, such as the processing circuitry as shown in FIG. 3. In some embodiments, the process (200) is implemented in software instructions, thus when the processing circuitry executes the software instructions, the processing circuitry performs the process (200).

The process (200) may generally start at step (S210), where the process (200) performs a first measurement on a consumption of a resource by running a first plurality of instances of an audio render program on an audio evaluation platform. Then, the process (200) proceeds to step (S220).

At step (S220), the process (200) performs a second measurement on the consumption of the resource by running a second plurality of instances of the audio render program on the audio evaluation platform. A first number of the first plurality of instances is different from a second number of the second plurality of instances. Then, the process (200) proceeds to step (S230).

At step (S230), the process (200) estimates the complexity of the audio render program based on the first measurement, the second measurement, the first number of the first plurality of instances, and the second number of the second plurality of the instances. Then, the process (200) terminates.

In one embodiment, the first number of the first plurality of instances is equal to the second number of the second plurality of instances minus one.

In one embodiment, the process (200) determines a consumption difference between the first measurement and the second measurement. The process (200) determines an instant number difference between the first number of the first plurality of instances and the second number of the second plurality of instances. The process (200) estimates the complexity of the program based on the consumption difference and the instant number difference.

In one embodiment, the process (200) performs a third measurement on the consumption of the resource by running a third plurality of instances of the audio render program on the audio evaluation platform. The process (200) estimates the complexity of the audio render program based on a linear regression model that is applied to the first measurement, the second measurement, and the third measurement.

In one embodiment, the resource comprises one of a central processing unit (CPU) runtime, a graphics processing unit (GPU) runtime, a CPU occupancy rate, or a GPU occupancy rate.

In one embodiment, the consumption of the resource is one of a runtime of the resource or an occupancy percentage of the resource.

In one embodiment, the platform is one of a CPU based platform or a GPU based platform.

III. Computer System

The techniques described above, can be implemented as computer software using computer-readable instructions and physically stored in one or more computer-readable media. For example, FIG. 3 shows a computer system (300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 3 for computer system (300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (300).

Computer system (300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (301), mouse (302), trackpad (303), touch screen (310), data-glove (not shown), joystick (305), microphone (306), scanner (307), and camera (308).

Computer system (300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (310), data-glove (not shown), or joystick (305), but there can also be tactile feedback devices that do not serve as input devices), audio output devices (such as: speakers (309), headphones (not depicted)), visual output devices (such as screens (310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (310)) can be connected to a system bus (348) through a graphics adapter (350).

Computer system (300) can also include human accessible storage devices and their associated media such as optical media including CD/DVD ROM/RW (320) with CD/DVD or the like media (321), thumb-drive (322), removable hard drive or solid state drive (323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (300) can also include a network interface (354) to one or more communication networks (355). The one or more communication networks (355) can for example be wireless, wireline, optical. The one or more communication networks (355) can further be local, wide-area, metropolitan, vehicular and industrial, real-time, delay-tolerant, and so on. Examples of the one or more communication networks (355) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (349) (such as, for example USB ports of the computer system (300)); others are commonly integrated into the core of the computer system (300) by attachment to a system bus as described below (for example Ethernet interface into a PC computer system or cellular network interface into a smartphone computer system). Using any of these networks, computer system (300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (340) of the computer system (300).

The core (340) can include one or more Central Processing Units (CPU) (341), Graphics Processing Units (GPU) (342), specialized programmable processing units in the form of Field Programmable Gate Areas (FPGA) (343), hardware accelerators for certain tasks (344), and so forth. These devices, along with Read-only memory (ROM) (345), Random-access memory (346), internal mass storage such as internal non-user accessible hard drives, SSDs, and the like (347), may be connected through the system bus (348). In some computer systems, the system bus (348) can be accessible in the form of one or more physical plugs to enable extensions by additional CPUs, GPU, and the like. The peripheral devices can be attached either directly to the core's system bus (348), or through a peripheral bus (349). Architectures for a peripheral bus include PCI, USB, and the like.

CPUs (341), GPUs (342), FPGAs (343), and accelerators (344) can execute certain instructions that, in combination, can make up the aforementioned computer code. That computer code can be stored in ROM (345) or RAM (346). Transitional data can also be stored in RAM (346), whereas permanent data can be stored for example, in the internal mass storage (347). Fast storage and retrieve to any of the memory devices can be enabled through the use of cache memory, that can be closely associated with one or more CPU (341), GPU (342), mass storage (347), ROM (345), RAM (346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (300) and specifically the core (340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (340) that are of non-transitory nature, such as core-internal mass storage (347) or ROM (345). The software implementing various embodiments of the present disclosure can be stored in such devices and executed by core (340). A computer-readable medium can include one or more memory devices or chips, according to particular needs. The software can cause the core (340) and specifically the processors therein (including CPU, GPU, FPGA, and the like) to execute particular processes or particular parts of particular processes described herein, including defining data structures stored in RAM (346) and modifying such data structures according to the processes defined by the software. In addition or as an alternative, the computer system can provide functionality as a result of logic hardwired or otherwise embodied in a circuit (for example: accelerator (344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of estimating a complexity of an audio render program, the method comprising:
   performing a first measurement on a consumption of a resource by running a first plurality of instances of the audio render program on an audio evaluation platform;
   performing a second measurement on the consumption of the resource by running a second plurality of instances of the audio render program on the audio evaluation platform, a first number of the first plurality of instances being different from a second number of the second plurality of instances; and
   estimating the complexity of the audio render program based at least on the first measurement, the second measurement, the first number of the first plurality of instances, and the second number of the second plurality of the instances.

2. The method of claim 1, wherein the first number of the first plurality of instances is equal to the second number of the second plurality of instances minus one.

3. The method of claim 1, wherein the estimating includes:
   determining a consumption difference between the first measurement and the second measurement;
   determining an instant number difference between the first number of the first plurality of instances and the second number of the second plurality of instances; and
   estimating the complexity of the audio render program based on the consumption difference and the instant number difference.

4. The method of claim 1, further comprising:
   performing a third measurement on the consumption of the resource by running a third plurality of instances of the audio render program on the audio evaluation platform; and
   estimating the complexity of the audio render program based on a linear regression model that is applied to the first measurement, the second measurement, and the third measurement.

5. The method of claim 1, wherein the resource comprises one of a central processing unit (CPU) runtime, a graphics processing unit (GPU) runtime, a CPU occupancy rate, or a GPU occupancy rate.

6. The method of claim 1, wherein the consumption of the resource is one of a runtime of the resource or an occupancy percentage of the resource.

7. The method of claim 1, wherein the audio evaluation platform is one of a CPU based platform or a GPU based platform.

8. An apparatus, comprising:
   processing circuitry configured to:
      perform a first measurement on a consumption of a resource by running a first plurality of instances of an audio render program on an audio evaluation platform;
      perform a second measurement on the consumption of the resource by running a second plurality of instances of the audio render program on the audio evaluation platform, a first number of the first plurality of instances being different from a second number of the second plurality of instances; and
      estimate a complexity of the audio render program based on the first measurement, the second measurement, the first number of the first plurality of instances, and the second number of the second plurality of the instances.

9. The apparatus of claim 8, wherein the first number of the first plurality of instances is equal to the second number of the second plurality of instances minus one.

10. The apparatus of claim 8, wherein the processing circuitry is further configured to:
determine a consumption difference between the first measurement and the second measurement;
determine an instant number difference between the first number of the first plurality of instances and the second number of the second plurality of instances; and
estimate the complexity of the program based on the consumption difference and the instant number difference.

11. The apparatus of claim 8, wherein the processing circuitry is further configured to:
perform a third measurement on the consumption of the resource by running a third plurality of instances of the audio render program on the audio evaluation platform; and
estimate the complexity of the audio render program based on a linear regression model that is applied to the first measurement, the second measurement, and the third measurement.

12. The apparatus of claim 8, wherein the resource comprises one of a central processing unit (CPU) runtime, a graphics processing unit (GPU) runtime, a CPU occupancy rate, or a GPU occupancy rate.

13. The apparatus of claim 8, wherein the consumption of the resource is one of a runtime of the resource or an occupancy percentage of the resource.

14. The apparatus of claim 8, wherein the audio evaluation platform is one of a CPU based platform or a GPU based platform.

15. A non-transitory computer-readable storage medium storing instructions, which when executed by at least one processor, cause the at least one processor to perform:
performing a first measurement on a consumption of a resource by running a first plurality of instances of an audio render program on an audio evaluation platform;
performing a second measurement on the consumption of the resource by running a second plurality of instances of the audio render program on the audio evaluation platform, a first number of the first plurality of instances being different from a second number of the second plurality of instances; and
estimating a complexity of the audio render program based on the first measurement, the second measurement, the first number of the first plurality of instances, and the second number of the second plurality of the instances.

16. The non-transitory computer-readable storage medium of claim 15, wherein the first number of the first plurality of instances is equal to the second number of the second plurality of instances minus one.

17. The non-transitory computer-readable storage medium of claim 15, wherein the stored instructions cause the at least one processor to perform:
determining a consumption difference between the first measurement and the second measurement;
determining an instant number difference between the first number of the first plurality of instances and the second number of the second plurality of instances; and
estimating the complexity of the audio render program based on the consumption difference and the instant number difference.

18. The non-transitory computer-readable storage medium of claim 15, wherein the stored instructions cause the at least one processor to perform:
performing a third measurement on the consumption of the resource by running a third plurality of instances of the audio render program on the audio evaluation platform; and
estimating the complexity of the audio render program based on a linear regression model that is applied to the first measurement, the second measurement, and the third measurement.

19. The non-transitory computer-readable storage medium of claim 15, wherein the resource comprises a central processing unit (CPU) runtime, a graphics processing unit (GPU) runtime, a CPU occupancy rate, or a GPU occupancy rate.

20. The non-transitory computer-readable storage medium of claim 15, wherein the consumption of the resource is one of a runtime of the resource or an occupancy percentage of the resource.

* * * * *